United States Patent [19]

Poleshuk

[11] Patent Number: 4,612,554

[45] Date of Patent: Sep. 16, 1986

[54] HIGH DENSITY THERMAL INK JET PRINTHEAD

[75] Inventor: Michael Poleshuk, Webster, N.Y.

[73] Assignee: Xerox Corporation, Stamford, Conn.

[21] Appl. No.: 760,009

[22] Filed: Jul. 29, 1985

[51] Int. Cl.[4] .............................. G01D 15/18

[52] U.S. Cl. .............................. 346/140 R; 156/647; 156/657; 156/659.1; 156/662; 346/75

[58] Field of Search .............................. 346/140, 75; 156/647, 156/657, 659.1, 662

[56] References Cited

U.S. PATENT DOCUMENTS

| | | | |
|---|---|---|---|
| 4,216,477 | 8/1980 | Matsuda | 346/140 |
| 4,335,389 | 6/1982 | Shirato et al. | 346/140 R |
| 4,377,814 | 3/1983 | Debesis | 346/140 R |
| 4,392,907 | 7/1983 | Shirato | 346/140 X |
| 4,417,251 | 11/1983 | Sugitani | 346/1.1 |
| 4,438,191 | 3/1984 | Cloutier et al. | 430/324 |
| 4,463,359 | 7/1984 | Ayota et al. | 346/1.1 |
| 4,571,599 | 2/1986 | Rezanka | 346/140 |

FOREIGN PATENT DOCUMENTS

| | | |
|---|---|---|
| 55-49274 | 4/1980 | Japan . |
| 55-49275 | 4/1980 | Japan . |

OTHER PUBLICATIONS

IBM Technical Disclosure Bulletin, vol. 21, No. 6, pp. 2585–2586, dated Nov. 1978, entitled "Two-Sided Groove Etching Method to Produce Silicon Ink Jet Nozzles".

Article "Fabrication of Novel Three-Dimensional Microstructures", by the Anisotropic Etching of (100) and (110) Silicon, by Ernest Bossous in IEEE Transactions or Electron Devices, vol. ED-25, No. 10 (Oct. 1978).

*Primary Examiner*—Joseph W. Hartary
*Attorney, Agent, or Firm*—Robert A. Chittum

[57] ABSTRACT

An ink jet printhead composed of substantially two identical parts and method of batch fabricating the parts. Each part has V-grooves anisotropically etched between a linear array of heating elements having selectively addressable electrodes which are parallel to each other. The grooved structures of the parts permit them to be mated face-to-face, so that they are automatically self-aligned by the inter-meshing of the lands containing the heating elements on one part with the grooves of the other part. A pair of parts may be used as a printhead for a carriage type ink jet printer or a plurality of parts may be assembled for a pagewidth printer. The pagewidth printhead is assembled by offsetting the first two parts a selected number of grooves when they are mated so that the subsequently added adjacent parts abut each other and yet are self-aligned with the confronting parts.

9 Claims, 14 Drawing Figures

HIGH DENSITY THERMAL INK JET PRINTHEAD

BACKGROUND OF THE INVENTION

1. Field of the Invention

This invention relates to a type of ink jet printing characterized by the discharge of droplets through an orifice of an ink jet printhead that are propelled by bubble generation at an electrically driven heating element in the printhead, and more particularly to a high density, thermal ink jet printhead and process for fabricating it.

2. Description of the Prior Art

In existing thermal ink jet printing, the printhead comprises one or more ink filled channels, such as disclosed in U.S. Pat. No. 4,463,359 to Ayata et al, communicating with a relatively small ink supply chamber at one end and having an orifice at the opposite end, sometimes referred to as a nozzle. A thermal energy generator or heating element, usually a resistor, is located in the channels near the nozzle a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper.

In U.S. Pat. No. 4,463,359, a thermal ink jet printer is disclosed having one or more ink-filled channels which are replenished by capillary action. A meniscus is formed at each nozzle to prevent ink from weeping therefrom. A resistor or heater is located in each channel at a predetermined distance from the nozzles. Current pulses representative of data signals are applied to the resistors to momentarily vaporize the ink in contact therewith and form a bubble for each current pulse. Ink droplets are expelled from each nozzle by the growth of the bubbles which causes a quantity of ink to bulge from the nozzle and break off into a droplet at the beginning of the bubble collapse. The current pulses are shaped to prevent the meniscus from breaking up and receding too far into the channels, after each droplet is expelled. Various embodiments of linear arrays of thermal ink jet devices are shown such as those haaving staggered linear arrays attached to the top and bottom of a heat sinking substrate and those having different colored inks for multicolored printing. In one embodiment, a resistor is located in the center of a relatively short channel having nozzles at both ends thereof. Another passageway is connected to the open-ended channel and is perpendicular thereto to form a T-shaped structure. Ink is replenished to the open-ended channel from the passageway by capillary action. Thus, when a bubble is formed in the open-ended channel, two different recording mediums may be printed simultaneously.

IBM Technical Disclosure Bulletin, Vol. 21, No. 6, pages 2585–6, dated November 1978 discloses differential etching of mutually perpendicular grooves in opposite surfaces of a (100) oriented silicon wafer. An array of nozzles is formed when the depth of the grooves is equal to one-half of the thickness of the wafer.

An article entitled "Fabrication of Novel Three-Dimensional Microstructures by the Anisotropic Etching of (100) and (110) Silicon" by Ernest Bassous, IEEE Transactions on Electron Devices, Vol. ED-25, No. 10, dated October 1978 discusses the anisotropic etching of single crystal silicon of (100) and (110) orientation and the fabrication of three types of microstructures; viz., (1) a high-precision circular orifice in a thin membrane for use as an ink jet nozzle, (2) a multisocket miniature electrical connector with octohedral cavities suitable for cryogenic applications, and (3) multichannel arrays in (100) and (110) silicon. To make some of these structures, a novel bonding technique to fuse silicon wafers with phosphosilicate glass films was developed. The membrane-type nozzles with circular orifices were fabricated by anisotropic etching of holes in combination with a process which takes advantage of the etch resistance of heavily doped $p+$ silicon in the etchant.

U.S. Pat. No. 4,438,191 to Cloutier et al discloses a method of making a monolithic bubble-driven ink jet printhead which eliminates the need for using adhesives to construct multiple parts assemblies. The method provides a layered structure which can be manufactured by standard integrated circuit and printed circuit processing techniques. Basically, the substrate with the bubble generating resistors and individually addressing electrodes have the ink chambers and nozzles formed thereon by standard semiconductor processing.

U.S. Pat. No. 4,335,389 to Y. Shirato et al discloses a liquid droplet ejecting recording head characterized in that the part of the electrothermal transducer contacting the liquid is made of a material which passes a particular weight decreasing test to assure that it will not wear excessively in the operating environment of growing and collapsing bubbles. The cavitational forces produced by rapidly generated and collapsed bubbles, severely erode unprotected heating elements and cause shortened operating lifetimes.

U.S. Pat. No. 4,377,814 to J. R. Debesis discloses corrugated members between adjacent droplet ejecting housings to isolate one from another to prevent cross-talk or the energization of a nozzle in one of the housings other than the selected one.

U.S. Pat. No. 4,417,251 to H. Sugitani discloses a method of manufacturing an ink jet head where the channels which constitute the ink flow path from the reservoir to the nozzles are formed in a layer of photosensitive material placed on a substrate.

Japanese patent application No. 53-122508 to T. Hamano, filed Oct. 6, 1978 and published without examination on Apr. 9, 1980 as Laid-Open No. 55-49274, discloses a fabricating technique for making nozzle plates by producing a mold via anisotropically etching of a single crystalline material to form a plurality of mesas.

Japanese patent application No. 53-122509 to T. Hamono, filed Oct. 6, 1978 and published without examination on Apr. 9, 1980 as Laid-Open No. 55-49275, discloses two single crystalline layers which sandwich therebetween an etching protective layer formed by boron doping of one of the confronting surfaces of the crystalline layers. An identically patterned protective layer is formed on each of the outer surfaces of the crystalline layers. Both of the crystalline layers are anisotropically etched to the center protective layer. The exposed center protective layer is removed and the nozzle plate covered by a protective film to prevent interaction with the ink and the nozzle with orifices at the center protective layer is obtained.

SUMMARY OF THE INVENTION

It is an object of this invention to provide a low-cost, high resolution ink jet printhead.

It is another object of this invention to provide a simple printhead construction which can be assembled from two identical parts.

It is still another object of this invention to batch produce a quantity of identical parts by forming a plurality of sets of bubble generating heating elements and their addressing electrodes on an insulative layer on the surface of a silicon wafer and by removing parallel strips of the insulative layer between the heating elements to expose the silicon to an anisotropic etch which produces V-grooves therein.

It is yet another object of this invention to enable the identical V-grooved parts to be mated face-to-face interlocking the lands containing the heating elements and addressing electrodes with the V-grooves, so that the parts are automatically aligned with ink channels being formed between the V-grooves on one part and the heating element containing land of the other part.

In the present invention, a plurality of ink jet printheads may be fabricated from a single (100) silicon wafer. In the preferred embodiment, the printheads are of the thermal, drop-on-demand type and adapted for line-by-line printing on a stepped recording medium from a reciprocating carriage-type printer. A plurality of sets of heating elements and their individually addressing electrodes are formed on an insulative layer on the surface of a silicon wafer. Parallel strips of the insulative layer between each heating element are removed to expose the surface of the wafer to an anisotropic etch which produces sets of elongated, parallel, V-grooves in the wafer. In one embodiment, an elongated recess is produced perpendicular to each set of V-grooves, but on the opposite side of the wafer, so that the bottom of an elongated recess communicates with the bottom of each V-groove in each set of V-grooves. This elongated recess will subsequently function as an ink supplying reservoir for each printhead. In another embodiment, the parallel strips of the insulative layer are patterned, so that shallow notches are formed in the parallel insulative layer stripes containing the heating elements and addressing electrodes. In this configuration, the anisotropic etching not only produces the V-grooves for the channels, but also notches each V-groove wall. These notches will function later as a means of intercommunication between the channels, thus eliminating the need for an elongated recess. Either a very small recess connecting to one of the V-grooves will be sufficient or a tube inserted in one of the outer, exposed notches could provide a means for supplying ink to the printhead from an ink cartridge.

The ends of each set of V-grooves and heating element electrodes are removed to open the ends of the V-grooves by parallel dicing cuts made perpendicular to the V-grooves. The individual parts having a set of heating elements and V-grooves are produced by dicing cuts made parallel to and between each set of V-grooves and heating elements. Each printhead is made by mating the lands containing the heating elements and addressing electrodes of one part with the V-grooves of the other part and bonding the two identical parts together. Each printhead is fixedly positioned on one edge of an L-shaped electrode board or daughter board, so that the open ends of the channels are parallel to the edge of the daughter board and may function as nozzles. The opposite ends of the channels are closed by, for example, an epoxy resin, except in the embodiment with the elongated recess, where at least one passageway between one of the V-grooves in one part of the printhead is connected with a one of the V-grooves in the other printhead part. The outer notches of the other embodiments are also sealed or closed. The printhead electrodes are connected to corresponding electrodes on the daughter board and the means for connecting any include intermediate flexible boards containing electrodes. The daughter board with printhead and possibly intermediate flexible board is mounted on an ink supply cartridge, which may optionally be disposable. The exposed printhead recess reservoir is sealingly positioned over an aperture in the cartridge in order that ink may fill and maintain ink in the printhead under a predetermined pressure.

The printhead, daughter board, and cartridge combination may, for example, be mounted on a carriage of an ink jet printer that is adapted for reciprocation across the surface of a recording medium, such as paper. The paper is stepped a predetermined distance each time the printhead's reciprocating direction is reversed to print another line. The array of printhead nozzles in this configuration are parallel to the direction of movement of the recording medium and perpendicular to the direction of traversal of the carriage. Current pulses are selectively applied to the heating elements in each channel from a controller in the printer in response to receipt of digitized data signals by the controller.

The current pulses cause the heating elements to transfer thermal energy to the ink which, as is well known in the art, vaporizes the ink and momentarily produces a bubble. The heating element cools after the passage of the current and the bubble collapses. The nucleation and expansion of the bubble forms an ink droplet and propels it towards the recording medium.

Alternatively, a printhead of any desired length can be assembled from the identical parts without loss of center-to-center spacing between nozzles. This is done by offsetting the first two parts assembled face-to-face by a number of V-grooves. The offset permits the abutment of a third part and the sharing of some of the confronting V-grooves by both of the abutted parts. Therefore, subsequently added pieces continue to be self-aligned as more and more parts are confrontingly mated, because two juxapositioned parts always share common confronting parts. In such an array, pagewidth printing is available and in this configuration, of course, the pagewidth array is fixed and oriented perpendicular to the direction of movement of the recording medium. During the printing operation, the recording medium continually moves at a constant velocity.

DESCRIPTION OF THE PREFERRED EMBODIMENT

Figure 1:
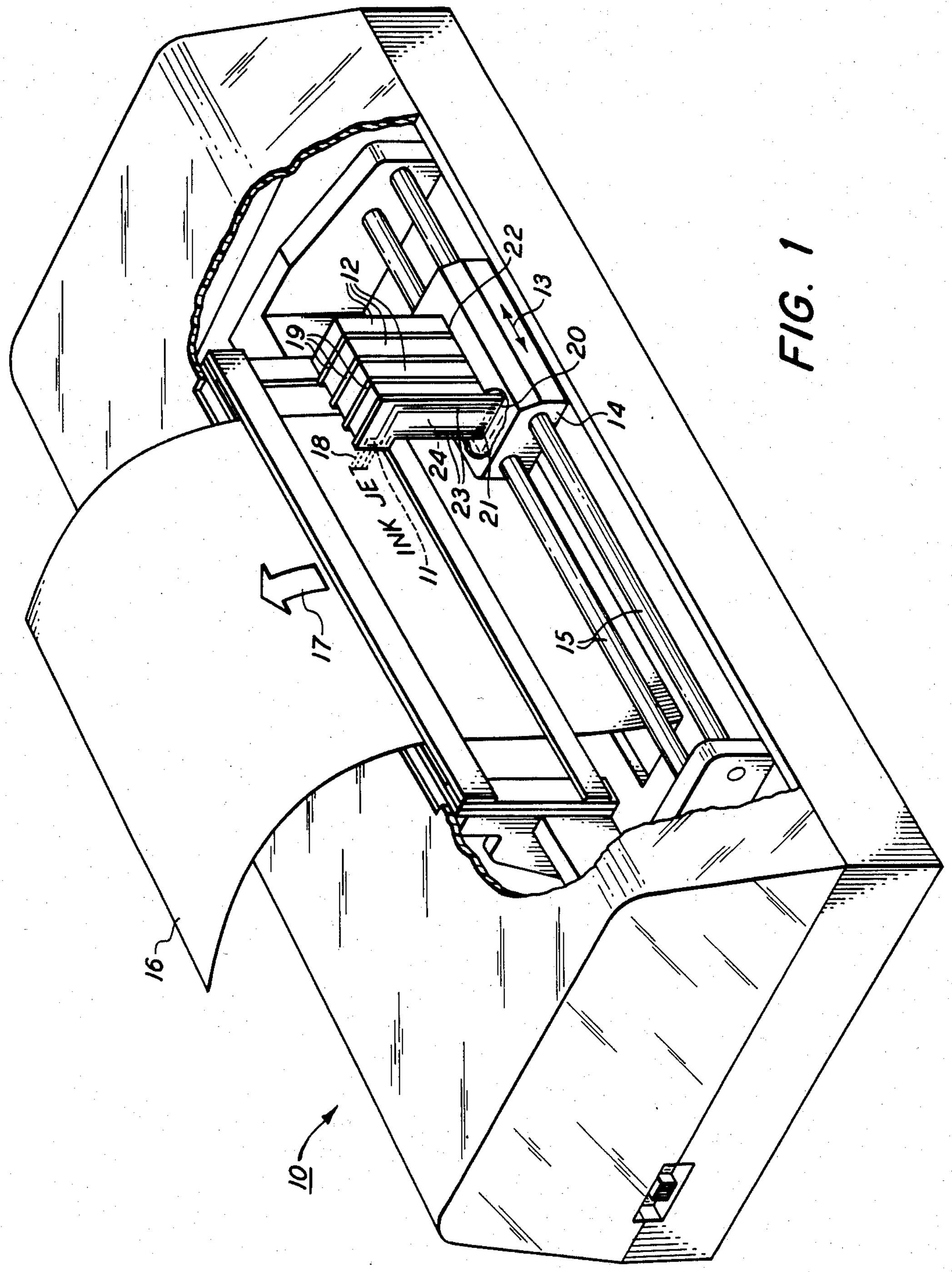
FIG. 1 is a schematic isometric view of a carriage type thermal ink jet printing system incorporating the present invention.
Figure 7:
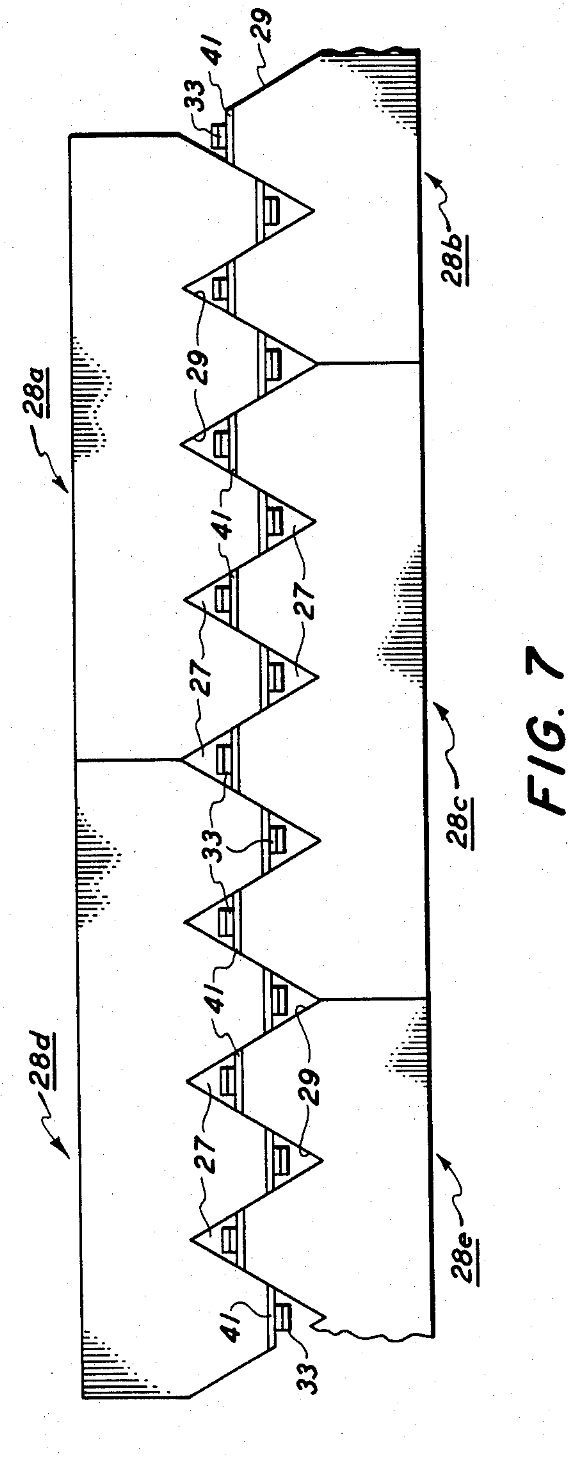
FIG. 7 is an enlarged front view of a plurality of printheads abutted together to form a single pagewidth printhead.

A typical carriage type, multicolor, thermal ink jet printer 10 is shown in FIG. 1. A linear array of ink droplet producing channels is housed in each printhead 11 of each ink supply cartridge 12, which may optionally be disposable. One or more ink supply cartridges are replaceably mounted on a reciprocating carriage assembly 14, which reciprocates back and forth in the direction of arrow 13 on guide rails 15. The channels terminate with orifices or nozzles which are aligned perpendicular to the carriage reciprocating direction (arrow 13) and parallel to the surface of the recording medium 16, such as paper. Thus, the printhead prints a swath of information on the recording medium, since it is held stationary while the carriage is travelling. The recording medium is stepped a distance equal to the printed swath in the direction indicated by arrow 17, as soon as the carriage assembly completes its traverse in one direction and prior to the carriage assembly reversing its reciprocating direction for travel in an opposite direction. As the carriage assembly with the printhead moves in the opposite direction, another swath of information is printed which is contiguous with the previous swath. Droplets 18 are expelled and propelled to the recording medium from the nozzles in response to digital data signals received by the printer controller (not shown), which in turn selectively addresses the individual heating elements, located in the printhead channels a predetermined distance from the nozzles with a current pulse. The current pulses passing through the printhead heating elements vaporize the ink contacting the heating elements and produce temporary vapor bubbles to expel droplets of ink from the nozzles. Alternatively, several printheads may be abutted to each other to form a pagewidth array of nozzles as shown in FIG. 7 and discussed more fully later. In this latter configuration, the nozzles are stationary and the paper continually moves therepast at a constant velocity. One or more pagewidth arrays of nozzles may be stacked such that each array expels an individual color of ink for multicolor, pagewidth printing.

In FIG. 1, several ink supply cartridges 12 and fixedly mounted electrode boards or daughter boards 19 are shown in which each sandwich therebetween a printhead 11, shown in dashed line. The printhead is permanently attached to the daughter board and their respective electrodes are connected together. A printhead fill hole or reservoir, discussed more fully later, is sealingly positioned against and coincident with an aperture (not shown) in the cartridge, so that ink from the cartridge is continuously supplied to the ink channels via the reservoir during operation of the printing device. This cartridge is similar to and more fully described in U.S. application Ser. No. 677,426 now U.S. Pat. No. 4,571,599 filed Dec. 3, 1984 by Ivan Rezanka and assigned to the same assignee as this application. Note that the lower portion 20 of each daughter board 19 has electrode terminals 21 which extend below the cartridge bottom 22 to facilitate plugging into a female receptacle (not shown) in the carriage assembly 14. In the preferred embodiment, the printhead contains 48 channels on 1 to 3 mil (25 to 75 micron) centers for printing with a resolution of 300 to 600 spots per inch (spi). Such a high density of addressing electrodes 23 on each daughter board is more conveniently handled by having some of the electrodes terminate on both sides. In FIG. 1, the side 24 shown is opposite the one containing the printhead. The electrodes all originate on the side with the printhead, but some pass through the daughter board. All of the electrodes 23 terminate at daughter board end 20.

Figure 2:
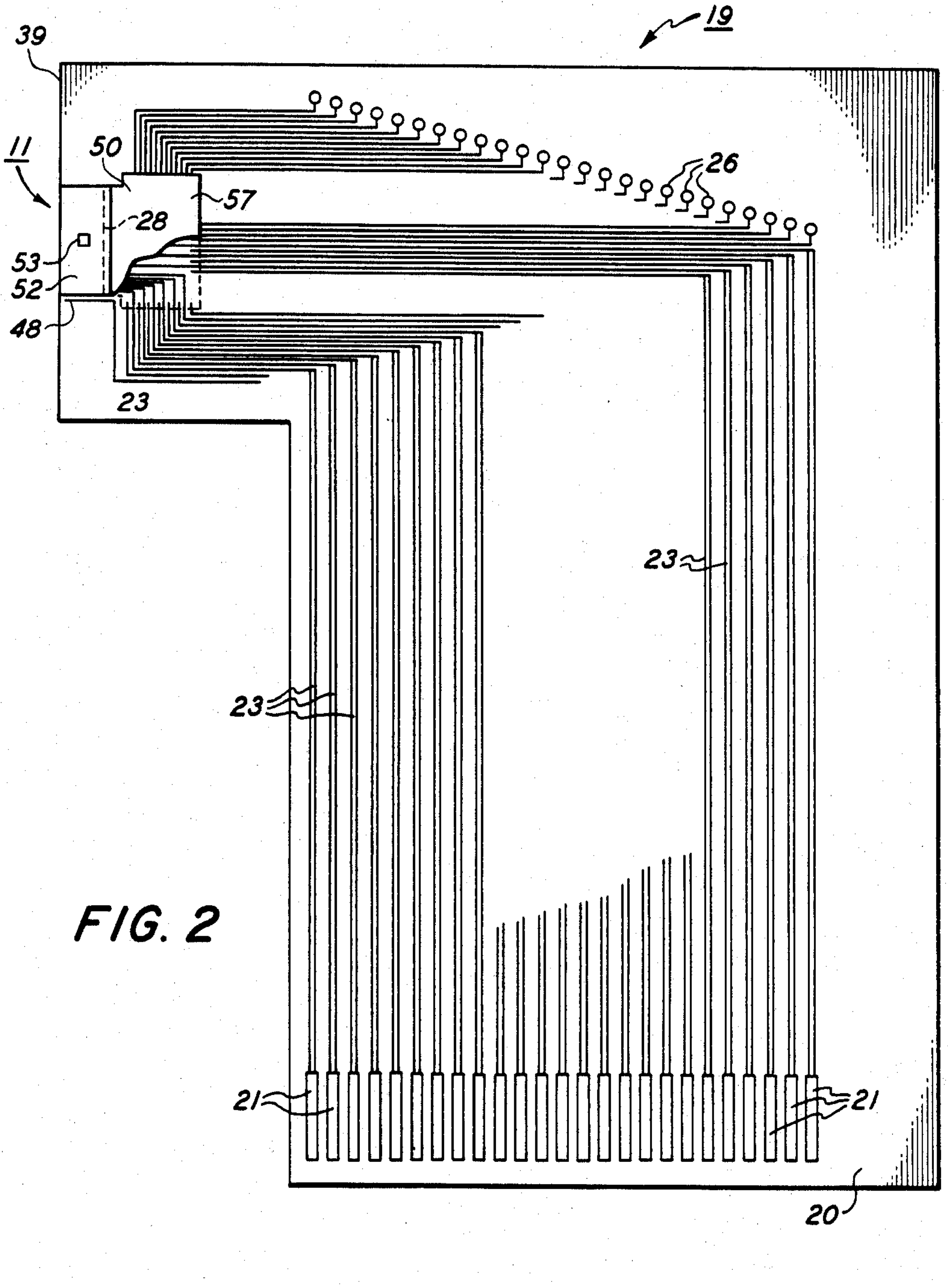
FIG. 2 is a plan view of the daughter board and fixedly mounted printhead of the present invention showing the printhead electrodes connected to the electrodes of a daughter board.

A plan view of the L-shaped daughter board 19 is shown in FIG. 2. This view is of the side containing the printhead 11. The daughter board electrodes 23 are on a one-to-one ratio with the electrodes of the printhead. In the embodiment shown, one printhead piece 28 is sealingly and fixedly attached to the daughter board and its electrodes 33 are wire-bonded to the daughter board electrodes 23 (see FIG. 12). As explained more fully later with respect to FIG. 11, the electrodes of the other printhead piece are first wire-bonded to intermediate electrodes 55 on a flexible T-shaped board 50 such as, for example, Kapton®, the printhead piece being bonded thereto. When the two identical pieces 28 are meshed and bonded together to form the printhead 11, the cantilevered end 56 of the flexible board may be flexed into contact with the appropriate daughter board electrodes and then permanently attached by adhesive, for example, as explained more fully later with respect to FIG. 13. A stiffener 52 is bonded to the flexible board to prevent its flexing where the wire bonds (not shown in this Figure) are connected. Though this arrangement is used in the preferred embodiment, numerous other techniques well known in the art may be used for connecting the electrodes of the printhead pieces to the daughter board electrodes, before or after the two identical pieces 28 are mated to form the printhead 11. The printhead reservoir fill hole 35 (FIG. 3) is aligned with openings 51, 53 in the flexible board and stiffener, respectively, so that an unobstructed passageway is available for movement of the ink from the cartridge to the printhead. About half of the daughter board electrodes 23 which are on the longer leg of the daughter board are on the opposite surface thereof so that both sides of the daughter board end portion 20 have substantially identical parallel arrays of terminals 21. The electrodes on the opposite side of the daughter board are electrically connected through the daughter board at locations 26.

Figure 3:
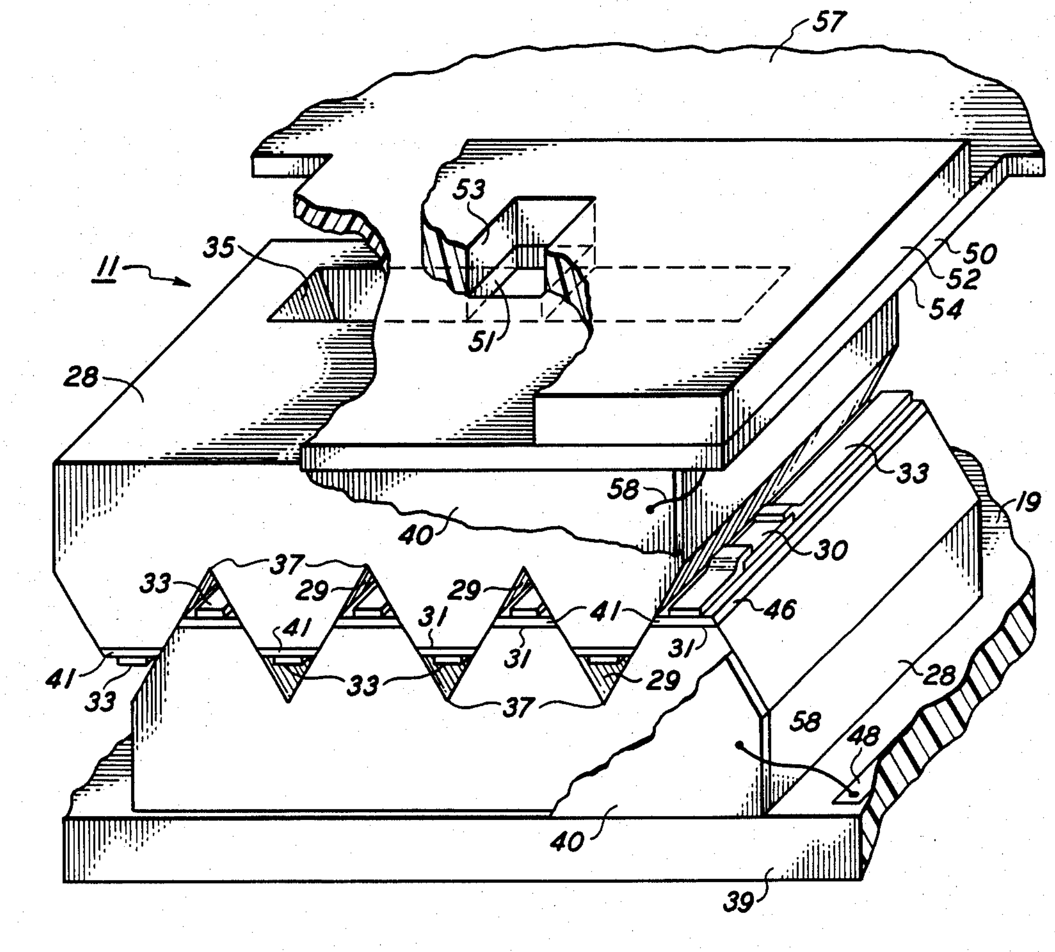
FIG. 3 is an enlarged isometric view of a printhead mounted on a partially shown daughter board, wherein the ink droplet emitting nozzles are shown.

One unique characteristic of this printhead invention is that it has a simple, two-piece body structure. The two pieces 28 are identical to each other and can be assembled or mated together to produce a complete printhead comprised of heating zones, heating elements, ink tunnels or channels, and discharge nozzles. The two-piece printhead of this invention is made possible by specially configured "V" grooves 29 anisotropically etched between rows of heating elements 30, more fully described later. The grooved structure allows identical pieces 28 to be placed face-to-face in a self-aligning manner, interlocking their respective lands 31 and grooves 29 as shown in FIG. 3, where an enlarged schematic isometric view is shown of the front face of this printhead 11 mounted on daughter board 19. In this Figure, the array of droplet emitting nozzles 27 is depicted. Though normally the number nozzles in a printhead number from 48 to 128 or more, for purposes of illustration six are shown. The tunnels or channels are formed by making the height of the lands 31 containing the heating elements less than the depth of the groove it fits into. Since each piece 28 contains heating elements 30 separated by grooves 29, the spaces between heating elements in one piece are filled with the lands of those of the second piece and visa versa. Such an arrangement provides the highest possible density of droplet emitting nozzles as well as adequate isolation of the channels to prevent cross talk; i.e., the inadvertent ink expulsion from nozzles adjacent the one associated with the channel having its heating element addressed with a current pulse.

Printheads of this type can be mass produced at relatively low cost by standard silicon integrated circuit fabrication technologies. Assembly requires one non-critical step of placing two identical pieces face-to-face. Alignment and interlocking of the two pieces is automatic and precise. Standard sealing techniques, such as the use of adhesives, can be incorporated into the assembly process whenever needed.

In FIG. 3, both confronting pieces 28 have the heating elements 30 and addressing electrodes 33 formed on the lands 31 between the grooves 29. The edge of the printhead with the nozzles 27 are shown, and near the opposite end of the channels formed by grooves 29, openings 34 (not shown in this Figure) at the bottom or apex 37 of the grooves communicate with a common manifold or reservoir 35. Thus, a respective one of the heating elements is positioned in each channel, formed by the grooves in one piece and the lands in the other piece. Concentric holes 51, 53 in the flexible board 50 and stiffener 52 respectively provide communication between the cartridge aperture (not shown) and the manifold 35. Ink enters the reservoir formed by the elongated recess 35 from the ink cartridge 12, to which the printhead 11 is sealingly attached, through an opening in the cartridge (not shown) via the concentric holes. If required, an O-ring seal may be used between the cartridge opening and the adjacent hole 53. A similar recess in the other printhead piece is sealed to the daughter board when the printhead is permanently attached thereto, so that the reservoir in this half of the printhead must be filled via at least one passageway (not shown) between a channel in each of the respective pieces 28. After the addressing electrodes 33 of one printhead piece are connected to the appropriate daughter board electrodes, the other identifical printhead piece is bonded to the surface 54 of the flexible board having the intermediate electrodes 55 patterned thereon. Next a stiffener 52 is bonded on the opposite surface 57 of the flexible board 50, so that flexing of the flexible board is not possible in the stiffened region. Also, refer to FIG. 11 discussed later. The printhead piece electrodes are wire-bonded to the intermediate electrodes on the flexible board. The stiffener 52 prevents the flexible board from flexing where the wire bonds are attached. The subassembly of printhead piece, flexible boad and stiffener are attached to the printhead piece already bonded to the daughter board, as explained above. The channel open ends opposite the nozzles are sealingly closed, except for at least one passageway (not shown) interconnecting at least a respective one of the channels in each of the printhead pieces. Any typical prior art method of sealing the channel ends will suffice, such as by using a thermosetting epoxy resin. The exposed and unused electrode 33 and heating element 30 on each printhead piece 28 may be removed by dicing or grinding for cosmetic purposes, but this operation is strictly optional, since the printhead functions perfectly as shown in FIG. 3. Of course, the patterning of the grooves, heating elements, and electrodes could be designed to provide a balanced, symmetrical printhead without the need for the optional dicing step, but this would mean that the upper and lower pieces would not be identical.

Figure 4A:
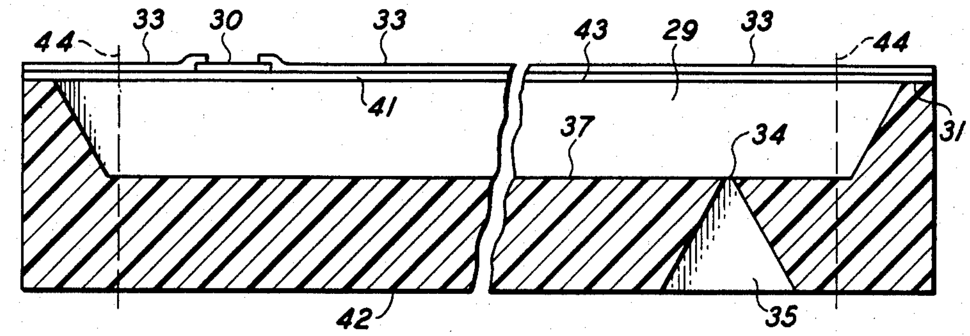
FIG. 4A is an enlarged cross-sectional view taken along line 4A—4A of FIG. 4.
Figure 4:
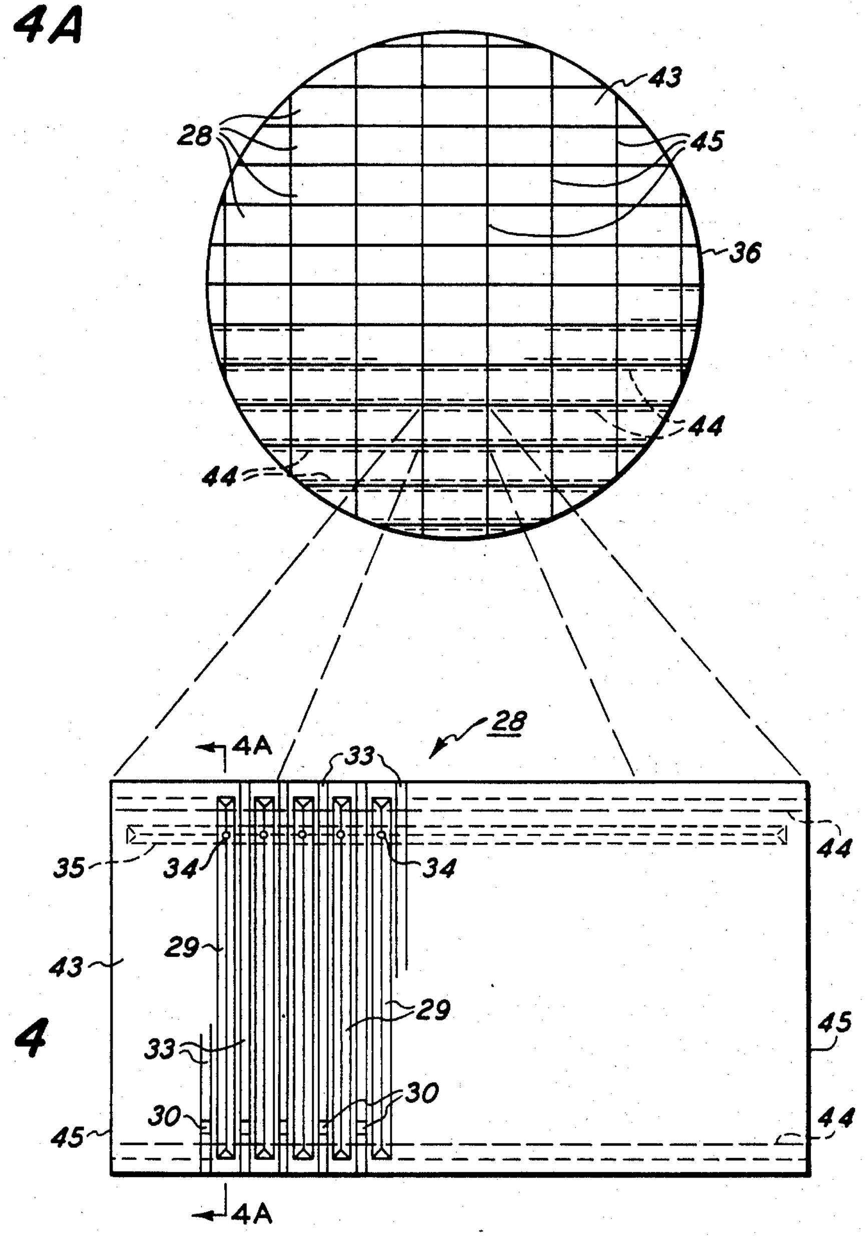
FIG. 4 is a schematic plan view of a wafer having a plurality of heating element arrays and addressing electrodes for each heating element, with one heating element array being shown enlarged.

In one embodiment, a plurality of pieces 28 may be produced from a two-side-polished, (100) silicon wafer 36, as shown in FIG. 4. After the wafer is chemically cleaned, a pyrolytic CVD silicon nitride layer 41 is deposited on both sides. Using conventional photolithography, a via for the common reservoir recess 35 for each of the plurality of pieces 28 are printed at predetermined locations on one side 42 of wafer 36, opposite the side shown in FIG. 4. The silicon nitride is plasma etched off of the patterns vias representing the recesses 35. A potassium hydroxide (KOH) anisotropic etch is used to etch the recesses. In this case, the {111} planes of the (100) wafer make an angle of 54.7 degrees with the surface 42 of the wafer. The width of the elongated recesses 35 are about 20 mils (0.5 mm), thus the recesses are etched to a terminating apex about half way to three quarters through the wafer. The relatively narrow recess is invarient to further size increase with continued etching, so that the recesses are not significantly time constrained. This etching takes about two hours and many wafers can be simultaneously processed.

Next, the opposite side 43 of wafer 36 is photolithographically patterned to form a plurality of set of resistive material deposits that will serve as the sets of heating elements 30, such as, for example, $ZrB_2$. Alternatively, the resistive material may be doped polycrystalline silicon which may be deposited by chemical vapor deposition (CVD), in which case the silicon nitride layer on this side of the wafer may be optionally replaced with a coating or underglaze layer, such as $SiO_2$, having a thickness of between 5000 Å and one micron.

Figure 5:
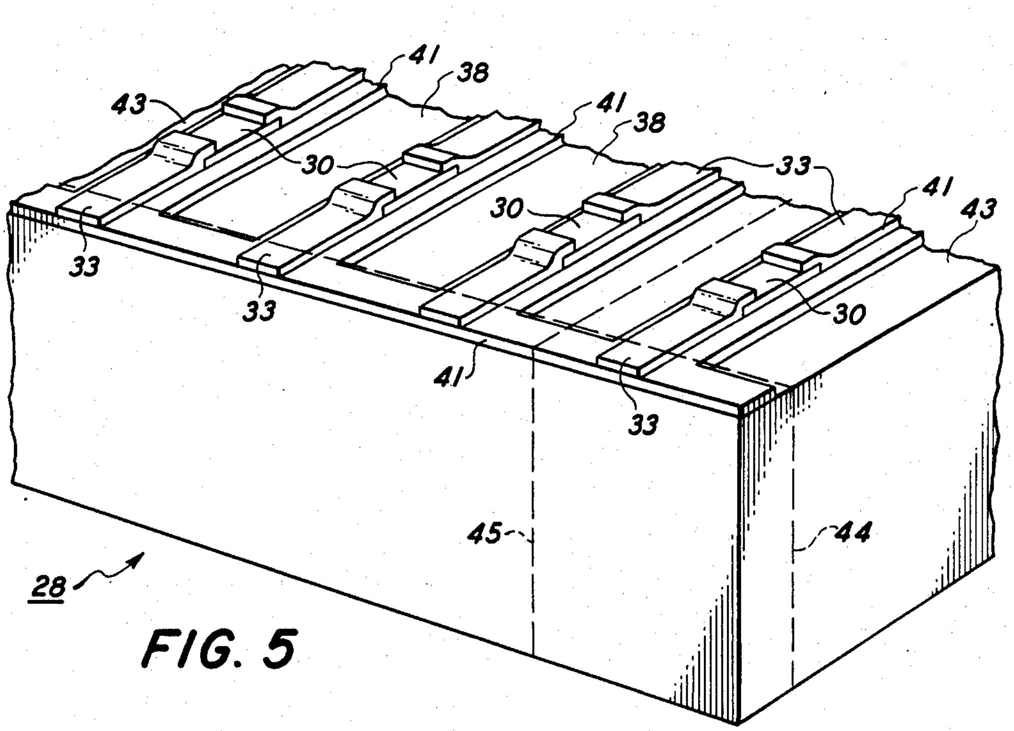
FIG. 5 is an enlarged, partially shown isometric view of the heating element array of FIG. 4.
Figure 6:
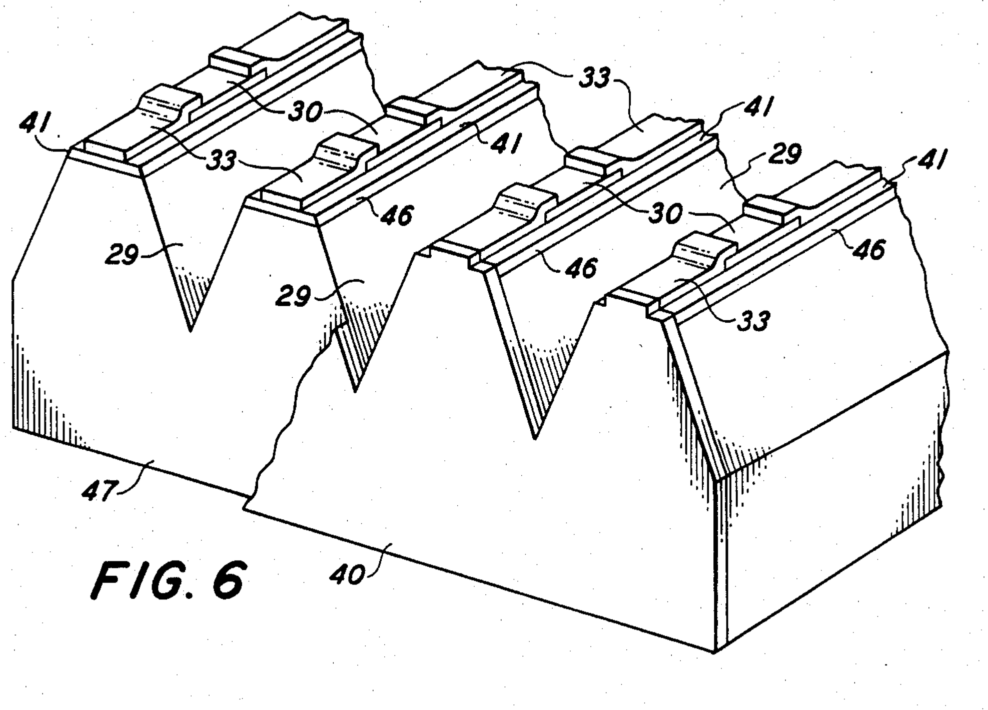
FIG. 6 is an enlarged, partially shown isometric view of FIG. 5, after anisotropic etching of the V-grooves to form one of the identical halves of the printhead.

The addressing electrodes 33 are aluminum leads deposited on the underglaze layer or silicon nitride and over the edges of the heating elements as shown in FIGS. 4A, 5 and 6. The electrodes 33 are deposited to a thickness of 0.5 to 3.0 microns, with the preferred thickness being 1.5 microns. For electrode passivation, a 2 micron thick phosphorous doped CVD $SiO_2$ film (not shown) is deposited over the entire plurality of sets of heating elements and addressing electrodes and subsequently etched off of the terminal ends for later connection with the daughter board electrodes and common return, deposited later. This etching may be by either the wet or dry etching method. Alternatively, the electrode passivation may be accomplished by plasma deposited $Si_3N_4$.

If polysilicon heating elements are used, they may be subsequently oxidized in steam or oxygen at a relatively high temperature of about 1100° C. for 50 to 80 minutes, prior to the deposition of the aluminum leads, in order to convert a small fraction of the polysilicon to $SiO_2$. In such cases, the heating elements are thermally oxidized to achieve an overglaze (not shown) of $SiO_2$ of about 500 Å to 1 micron which has good integrity with substantially no pin holes. The thermally grown overglaze is removed from the opposing edges of polysilicon heating elements for attachment of the later deposited electrodes. When polysilicon heating elements are used, the portion of the electrode passivation layer over the resistive material and associated thermal oxide layer is removed concurrently with its removal from the electrode terminals.

A tantalum (Ta) layer (not shown) may optionally be deposited to a thickness of about 1 micron on the oxidized polysilicon overglaze or passivation layer covering the heating elements for added protection thereof against the cavitational forces generated by the collapsing ink vapor bubbles during the printhead operation. The Ta layer is etched off all but the heating elements using, for example, $CF_4/O_2$ plasma etching.

Figure 8:
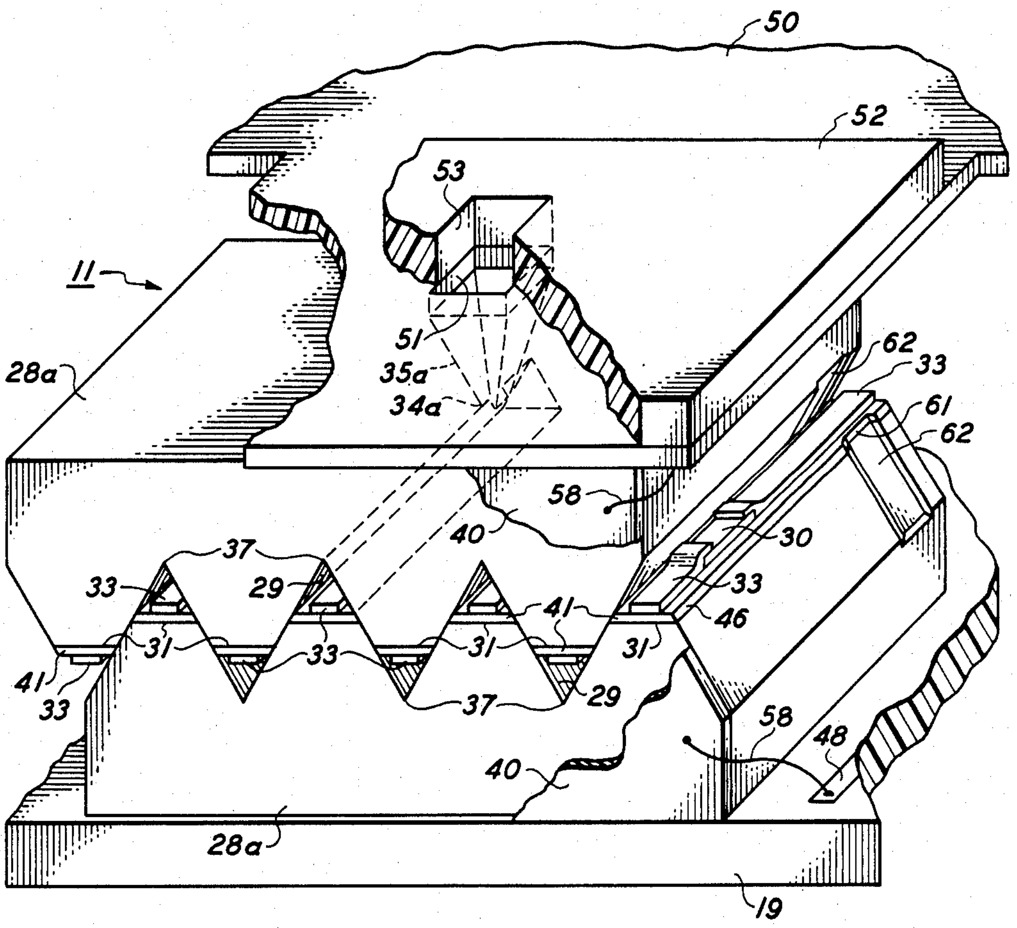
FIG. 8 is an enlarged isometric view of an alternate embodiment of the printhead in FIG. 3.

In the next process step, a plurality of sets of parallel strips of the wafer surface coating 41 and electrode heating element passivation layer are photolithographically patterned and removed to expose the wafer surface 43 between the rows of heating elements and electrodes. The surface coating 41 and passivation layer are removed by techniques well known in the art to obtain walls having sloping edges 46 with the exposed wafer surface 43. As can be seen in FIGS. 3 and 8, the two identical printhead pieces 28 fit more tightly together when their protective layers have sloping edges. Anisotropic etching of the exposed silicon in, for example, KOH, forms V-grooves 29. The vias in the nitride and/or other passivation layers have a length longer than the desired subsequent ink channels and a width of 1 to 4 mils (25 to 100 microns). Anisotropic etching of (100) silicon wafers must always be conducted through square or rectangular vias, so that the etching is along the {111} planes. Thus, each recess produced by the etching has walls at 54.7 degrees with the wafer surface, and if the vias are small enough with respect to the wafer thickness, V-grooves are formed instead of openings therethrough. As is well known in the art, only internal corners may be anisotropically etched, because external or convex corners do not have {111} planes to guide the etching and the etchant etches away such corners very rapidly. This is why the channels cannot be opened at their ends, but instead must be opened by a separate process, such as dicing or milling. Accordingly, after the V-groove recesses 29 are formed, the individual printhead pieces 28 are diced along lines 44 as well as along lines 45 to produce completed printhead pieces 28 suitable for face-to-face assembly as shown in FIG. 3. A cross-sectional view is taken along line 4A—4A of the enlarged plan view of piece 28 in FIG. 4 and is shown at FIG. 4A.

Since the width of the vias used to etch the V-grooves 29 are very narrow, the etching process stops at the intersection of the recess walls at apex 37. The depth of this apex from the wafer surface 43 is designed to slightly intersect the V-groove bottom of the reservoir recess 35, so that openings 34 are formed in each V-groove or channel 29, thus forming a common reservoir or manifold 35 for the channels of each printhead piece.

For clarity of description, enlarged isometric views are shown in FIGS. 5 and 6 depicting a printhead piece 28 having only four heating elements with addressing electrodes and three channels. FIG. 5 shows the vias 38 between the heating elements 30 and aluminum electrodes 33 which expose the wafer surface 43. FIG. 6 shows the printhead piece 28 after the anisotropic etching that produced the V-groove recess channels 29 and after the dicing cuts along the planes or lines 44 and45, shown in dashed line in FIG. 5, to open the ends of the channels that will ultimately function as nozzles and to divide the pieces 28 a the bottom of one of the grooves 29. Note that the silicon nitride layer 41 on which the heating elements and electrodes are formed act as an etch mask to define the position of the vias for channel recesses 29. Depth of the etch is controlled, as stated earlier, by the width of the vias or the nitride layer stripes. Heating elements spaced a predetermined distance from the printhead piece face 47 are connected to a common return 40 which may be, for example, formed on the entire printhead face 44*a* by omni-directional sputtering (i.e., sputtering in all directions on surface 44*a*) of a metal such as aluminum. The placement of such a common return must be accomplished without blocking or obstructing the channel open end which will eventually act as nozzles 27, see FIG. 3. The common return 40 is then covered by a passivating layer (not shown) to protect it from the ink, after the wire bond 58 is in place. Wire bonds or beam leads formed at the far end of the addressing electrodes can be terminated at a flexboard strip line or at an attached edge connector, either of which may then be wire-bonded to the daughter board electrodes.

Alternatively, a single-side-polished, (100) wafer may be used if the common ink reservoir 35 may be placed orthogonal to the V-groove channels 29 from the same side. Such may be accomplished by first etching the common reservoir and then filling it with polysilicon glass (PSG) prior to the heater formation (not shown). Upon completion of the body fabrication, the PSG can be etched out to join the reservoir to each channel. The addressing electrodes 33 fabricated over the PSG will bridge across the reservoir.

As shown in the front view of FIG. 7, a printhead of any desired length can be assembled from the printhead pieces 28 without loss of center-to-center spacing between nozzles 27. This is done by offsetting the first two pieces 28 which normally form a printhead by a predetermined number of channel grooves 29. Subsequent pieces added to the offset regions will self-align and abut together as shown by combining printhead pieces 28*a*, 28*b*, 28*c*, 28*d*, 28*e*, etc. As with FIGS. 3, 5 and 6, the printhead pieces are depicted as having four heating elements and three grooves for simplicity and ease of understanding, while commercial embodiments generally have at least 48 channels or nozzles. Also, omitted for clarity are means of attaching the printhead electrodes to the source of current pulses representing digitized data signals, such as the use of intermediate electrodes on flexible boards depicted in FIGS. 3 and 8. By using the configuration of FIG. 7, a pagewidth printhead may be provided which may be held stationary, while the recording medium moves thereby at a constant velocity, during the printing operation, and in a direction perpendicular to the linear array of nozzles. One major advantage of pagewidth printing, of course, is that the speed of printing is greatly increased, since the recording medium does not have to be held stationary as is required by carriage-type printers. In addition, pagewidth printers, as shown in FIG. 7, may be stacked, each using a different colored ink from separate ink reservoirs (not shown).

Figure 9:
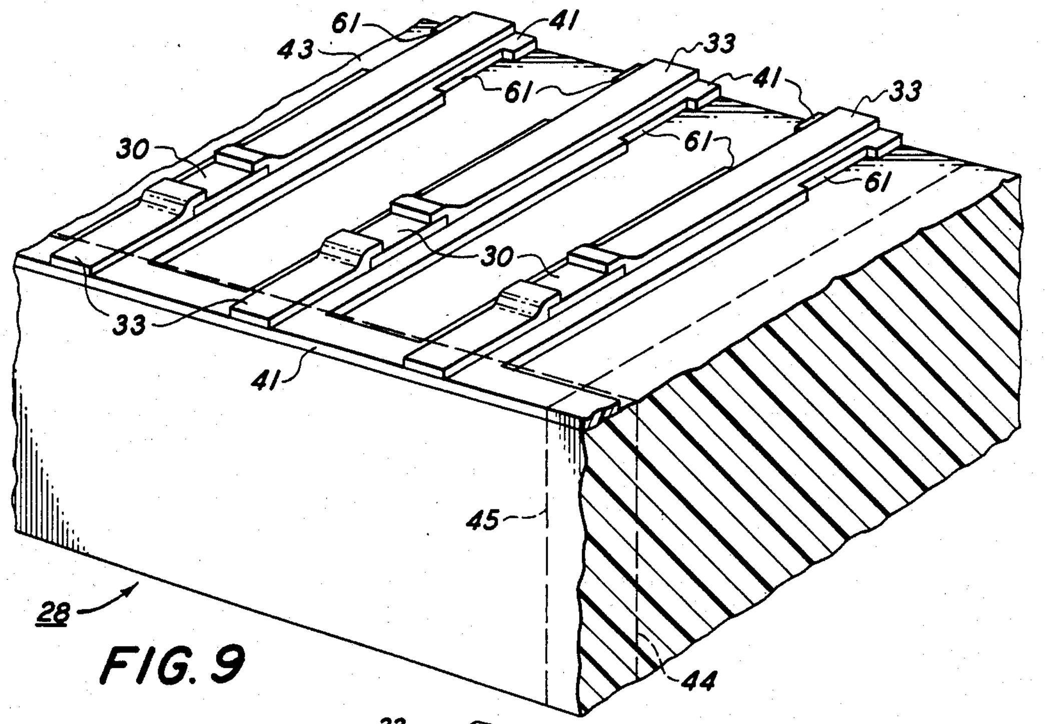
FIG. 9 is an enlarged, partially shown isometric view of an alternate embodiment of the heating element array of one printhead piece showing insulative layer pattern with the notches.
Figure 10:
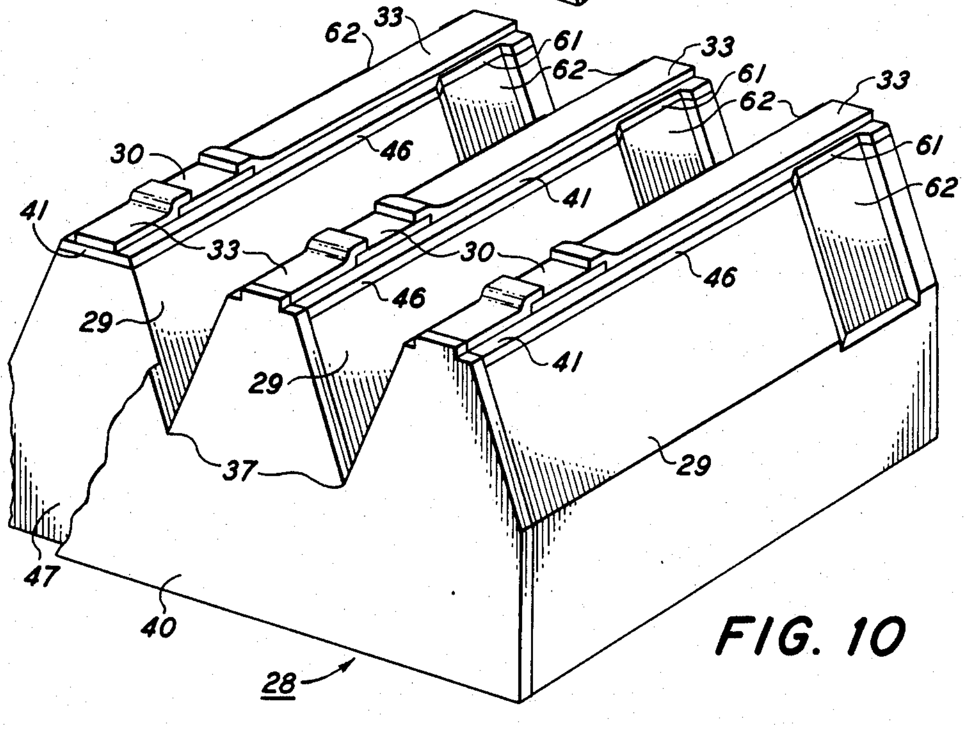
FIG. 10 is an enlarged, partially shown isometric view of FIG. 9, after anisotropic etching of the V-grooves with notches in each side wall to form one of the identical halves of the printhead alternate configuration.

An alternate embodiment is shown in FIGS. 8, 9 and 10 where parts identical with the embodiment of FIGS. 3, 5 and 6 have the same index numerals and similar parts have the same numerals but have the subscript "a." In this alternate embodiment, integral ink supplying tunnels are formed during the V-groove anisotropic etching step by defining the insulating nitride layer stripes holding the heating elements 30 and addressing electrodes 33 such that each has a reduced width portion 61. This produces a depression 62 in each side wall of the V-grooves 29. When the two identical parts **28*a* are interlocked to form the printhead 11*a*, the depressions 62 are aligned to form ink tunnels which interconnect open portions of V-groove channels in a continuous manner across the width of the printhead. The integral ink tunnel is terminated either by excluding the depression 62 from the outermost V-grooves 29 or by sealing the outer tunnels openings with a sealant such as epoxy (not shown). Ink may be fed to the printhead via one of these outer tunnel openings by, for example, a tube (not shown) or by a recess 35*a* anisotropically etched into the printhead piece 28 such that its apex opens at inlet 34*a* into a one of the V-grooves 29. In all other respects, this alternate embodiment of FIGS. 8 to 10 is produced, fabricated and operated in the same way as the embodiment of FIGS. 1 through 7**.

Figure 11:
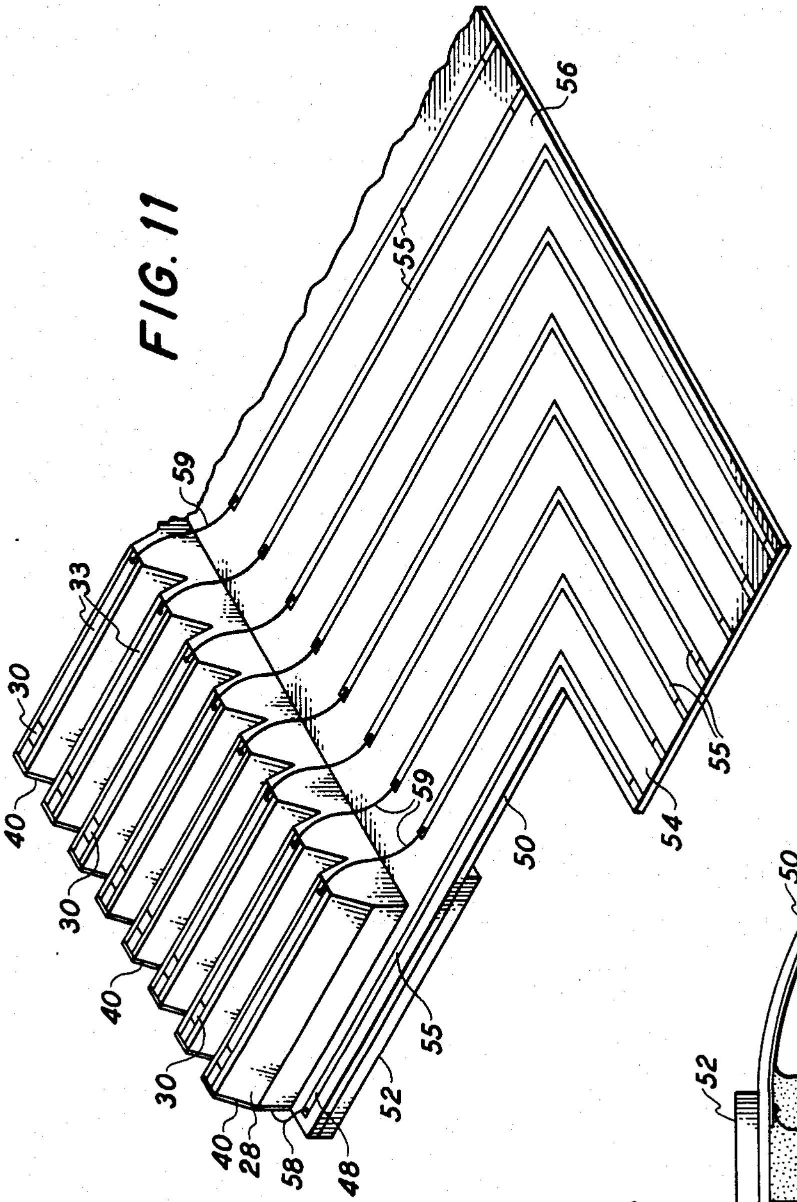
FIG. 11 is an enlarged, isometric view of an alternate embodiment showing use of intermediate flexible board for a one of the printhead pieces for electrode interconnection with the electrodes of the daughter board.
Figure 13:
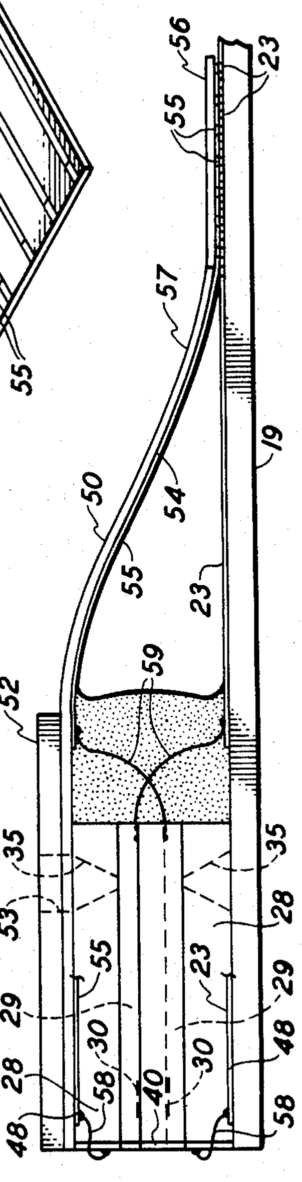
FIG. 13 is a side view of the alternate means of interconnecting printhead electrodes with the daughter board electrodes using the configurations shown in FIGS. 11 and 12.
Figure 12:
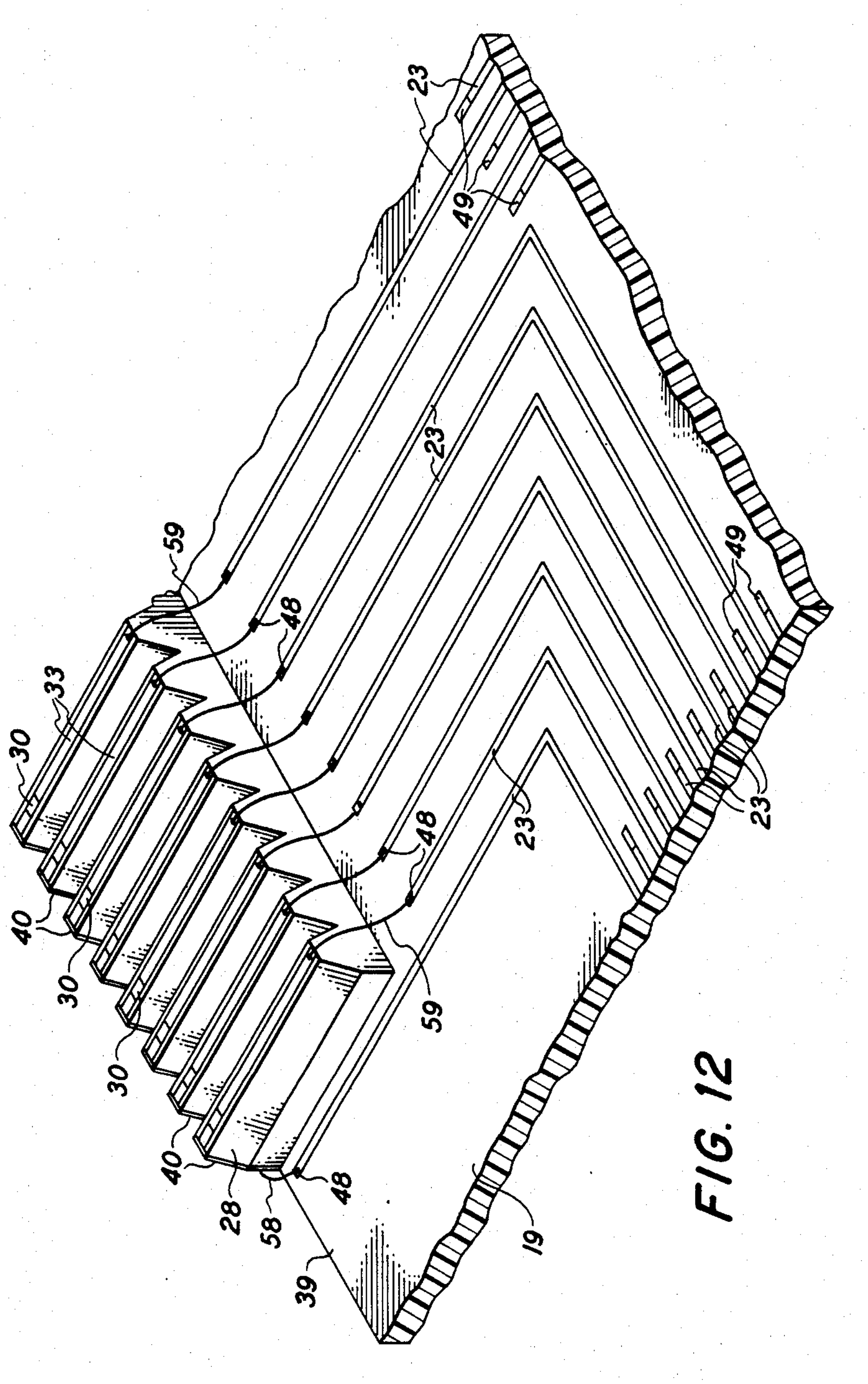
FIG. 12 is an enlarged isometric view of an alternate embodiment of the wire-bonding of the electrodes of a one of the printhead pieces to the daughter board electrodes.

FIGS. 11, 12 and 13 depict one way to assemble the two identical printhead pieces 28 or **28*a*, mount them on the daughter board 19, and wire bond them to the daughter board electrodes 23. First, as shown in FIG. 12, one printhead piece is bonded to the daughter board with the V-grooves 29 perpendicular to the edge 39 of the short leg thereof and with the printhead piece surface having the common return 40 coplanar to the daughter board edge 39. The addressing electrodes 33 and common return 40 are wire-bonded to the nearer ends 48 of the daughter board electrode 23. Next, as shown in FIG. 11, one of the printhead pieces 28 is bonded to surface 54 of a T-shaped flexible board 50 such as, for example, Kapton® having intermediate electrodes 55 on one portion. A stiffener 52 is bonded on the opposite flexible board surface 57 to sandwich a portion of the flexible board 50 between the stiffener and the printhead piece. The stiffener prevents the flexible boad from flexing in the vicinity of the ends of the intermediate electrodes adjacent the printhead piece. The printhead electrodes 33 and common return 40 are wire-bonded to the adjacent ends of the intermediate electrodes 55 and the stiffener prevents debonding of the wire bonds 58, 59 because the flexible board cannot bend or twist in the vicinity of them. As shown in FIG. 13, the sub-assembly comprising the printhead piece, flexible board and stiffener is mated to the printhead piece bonded to the daughter board with the lands of one printhead piece having the heating elements and addressing electrodes meshed into the V-grooves of the other printhead piece. The mated printhead pieces are bonded together and the cantilevered portion 56 of the flexible board moved toward daughter board, so that appropriate daughter board electrode terminals 49 are in electrical contact with the intermediate electrodes 55 on the flexible board whereat they are bonded together. All of the electrodes are passivated and the wire bonds 59 are encased in an electrical insulative material such as epoxy. As discussed earlier with respect to FIG. 3, a hole 51 in the flexible board and in hole 53 in the stiffener are aligned with the elongated reservoir 35 (FIG. 3) or hole 35*a* (FIG. 8). As explained earlier, these holes 51, 53 are sealingly connected to the aperture of the ink supply cartridge 12**.

Many modifications and variations are apparent from the foregoing description of the invention and all such modifications and variations are intended to be within the scope of the present invention. For example, the above described invention could be used for a continuous stream ink jet printer by using the bubbles generated by the heating elements as a means for perturbing the ink that would be continually streaming from the nozzles in order to break the streams into droplets a fixed distance from the nozzles, whereat charging electrodes would place a charge on the droplets according to its impact location on the recording medium or whether the droplet should be directed to a collecting gutter for recirculation. All changes required to modify this inventive printhead for continuous stream ink jet printing are well known from the prior art.

I claim:

1. An ink jet printhead for a drop-on-demand thermal ink jet printer, the printhead being of the type having a plurality of parallel channels, each channel being supplied with ink and having one open end which serves as an ink droplet ejecting nozzle, a heating element being positioned in each channel a predetermined distance from the nozzle, ink droplets being ejected from the nozzles by the selective application of current pulses to the heating elements in response to digitized data signals received by the printer, the heating elements transferring thermal energy to the ink in contact therewith causing the formation and collapse of temporary vapor bubbles that expel the ink droplets, said printhead comprising:

at least two substantially identical parts, the parts having first and second planar surfaces which are mutually perpendicular to parallel opposing edge faces, the first surface of each part containing a linear array of equally spaced heating elements, each heating element having opposing sides and being located a fixed distance from a one of the part edge faces, addressing electrodes connecting one side of the heating element to a common return and the other side to an electrode terminal, the addressing electrodes being parallel to each other and perpendicular to the part edge faces, a groove with a V-shaped, cross-sectional area between each heating element and its associated addressing electrode being parallel to each other and the addressing electrode, the grooves extending substantially across the part first surface, and penetrating the edge faces, the two parts being fixedly mated together with their first surfaces engagingly meshed together, so that their respective heating elements and associated addressing electrodes reside in the grooves of the other part, the grooves of the engaged parts forming channels around the heating elements and the open ends of the channels near the heating elements serve as the nozzles, the opposite open channel ends being closed and each channel having means for communication with each other near their closed ends;

means for supplying ink to the channels; and means for selectively applying current pulses to the addressing electrode terminals and for grounding the common return.

2. The printhead of claim 1, wherein the edge faces of the mated parts which contain the nozzles are coated with an electrically conductive material for use as the common return, and wherein the common return is coated with a passivation layer to protect it from the ink.

3. The printhead of claim 2, wherein the current pulse applying and grounding means comprises:

a daughter board having electrodes thereon, one electrode for each printhead addressing electrode and at least one electrode for the common return, the printhead being fixedly mounted thereon with one of the printhead parts having its second planar surface in contact with the daughter board and with the printhead nozzles positioned at one edge thereof, the printhead addressing electrodes and common return being wire-bonded to the daughter board electrodes.

4. The printhead of claim 3, wherein the ink supplying means comprises:

a V-groove shaped recess in the second planar surface of each of the printhead parts, the second planar surface recess being perpendicular to the parallel V-grooves in the first planar surface of the printhead part and having a depth sufficient to intersect said first planar surface grooves, whereby the recess in the second planar surface of the printhead part contacting the daughter board is sealingly closed thereby;

tube means for interconnecting a one of the channels of one of the printhead parts through its closed end with a one of the channels of the other printhead part through its closed end, so that all of the channels are in communication with each other; and an ink supplying cartridge having an aperture therein, the second planar surface of the printhead part not fixedly contacting the daughter board being attached to said cartridge, the second planar surface recess therein being aligned and sealed with said cartridge aperture, so that the second planar surface recesses serve as ink reservoirs for the channels.

5. The printhead of claim 4, wherein the printhead further comprises:

an intermediate, flexible board having a set of electrodes on one surface thereof, the flexible board having an opening therethrough and a portion of the flexible boad surface being bonded to the second planar surface of the printhead part not fixed to the daughter board, the flexible board opening being aligned and sealed with the recess of the adjacent second planar surface of the printhead part, the addressing electrodes and common return of the adjacent printhead part being wire-bonded to the flexible board electrodes;

a planar stiffener with a hole therethrough having one of its surfaces bonded to the flexible board with its hole aligned and sealed with the flexible board opening, the stiffener preventing the flexible board from flexing in the vicinity of the wire bonds by sandwiching a portion of the flexible board between it and the adjacent printhead part, so that the remaining portion of the flexible board is cantilevered therefrom with the flexible board electrodes confronting the daughter board electrodes, the stiffener being attached to the ink supplying cartridge with the stiffener hole being in alignment with the cartridge aperture and sealed against ink leakage therefrom;

the cantilevered portion of the flexible board being moved toward the daughter board and affixed thereto, so that appropriate daughter board electrodes are in electrical contact with the electrode of the flexible board; and means for passivating and protecting the wire bonding.

6. The printhead of claim 3, wherein the ink supplying means comprises:

a notch in the walls of each V-groove used to form the channels, so that ink may flow from one channel to another, the notches on either end of the two mated printhead parts being closed to prevent the leakage of ink therefrom; and a recess in the second planar surface of each printhead part having a depth sufficient to penetrate a one of the parallel V-grooves in the first planar surfaces of the printhead parts; and an ink supplying cartridge having an aperture therein, the cartridge being attached to the printhead with its aperture aligned with the recess in the adjacent printhead part second planar surface and sealed against ink leakage therefrom.

7. The printhead of claim 6, wherein the printhead further comprises:

an intermediate, flexible board having a set of electrodes on one surface thereof, the flexible board having an opening therethrough and a portion of the flexible board surface being bonded to the second planar surface of the printhead part not fixed to the daughter board, the flexible board opening being aligned and sealed with the recess of the adjacent second planar surface of the printhead part, the addressing electrodes and common return of the adjacent printhead part being wire-bonded to the flexible board electrodes;

a planar stiffener with a hole therethrough having one of its surfaces bonded to the flexible board with its hole aligned and sealed with the flexible board opening, the stiffener preventing the flexible board from flexing in the vicinity of the wire bonds by sandwiching a portion of the flexible board between it and the adjacent printhead part, so that the remaining portion of the flexible board is cantilevered therefrom with the flexible board electrodes confronting the daughter board electrodes, the stiffener being attached to the ink supplying cartridge with the stiffener hole being in alignment with the cartridge aperture and sealed against ink leakage therefrom;

the cantilevered portion of the flexible board being moved toward the daughter board and affixed thereto, so that appropriate daughter board electrodes are in electrical contact with the electrode of the flexible board; and means for passivating and protecting the wire bonding.

8. An ink jet printhead for a pagewidth, drop-on-demand, thermal ink jet printer, comprising:

a plurality of substantially identical parts being assembled together to form a fixed linear array, each part having first and second planar surfaces with two opposing parallel edge faces perpendicular to the planar surfaces, the first surface of each part containing a linear array of equally spaced heating elements, each heating element having opposing ends and being located a fixed distance from a one of the part edge faces, addressing electrodes connecting one end of the heating element to a common return and the other end to an electrode terminal, the addressing electrodes being parallel to each other and perpendicular to the part edge faces, each part having a groove with a V-shaped, cross-sectional area between each heating element and its associated addressing electrodes, the grooves being parallel to each other and the addressing electrodes, the grooves extending across the part first surface and penetrating the edge faces, the linear array of parts being produced by abutting a linear row of a predetermined number of parts together, so that all of the grooves are parallel with each other and the heating elements of each part are equidistant from a plane coincident with one of the part edge faces, and by fixedly mating an equal number of parts with the linear row of parts with the first surfaces of each part confronting each other, so that their-respective heating elements and associated addressing electrodes reside in the grooves of the confrontingly engaged part, any two engaged parts being offset from each other a predetermined number of grooves, so that every abutting part is self-aligned with each other and its confrontingly engaged part, each groove forming a channel around a one of the heating elements, and the open ends of the channels nearer the heating elements serving as ink emitting nozzles, and the opposite open ends of the channels being closed;

means for supplying ink to the channels;

means for providing communication between each channel near their closed ends; and means for selectively applying current pulses to the addressing electrodes in response to digitized data signals and for grounding the return, whereby the heating elements transfer thermal energy to the ink in contact therewith causing the formation and collapse of temporary vapor bubbles which expel ink droplets from the nozzles.

9. A method for fabricating a plurality of printheads for use in ink jet printers, comprising the steps of:

(a) cleaning a silicon substrate, each having first and second parallel surfaces, the substrate surfaces being {100} planes;

(b) depositing a layer of insulative material on the surfaces of the substrates;

(c) forming a plurality of sets of equally spaced, linear arrays of resistive material on the first surface of the substrate at predetermined locations for use as heating elements and forming a pattern of electrodes on the same substrate surface for enabling individual addressing of each heating element with current pulses;

(d) depositing a passivation layer over the heating elements and addressing electrodes and clearing the ends of the electrodes of the passivation layer for subsequent connection to a source of current pulses;

(e) photolithographically patterning the passivation layer to produce elongated vias in both the passivation and insulation layers between each resistive material and its associated addressing electrode of each array to expose the substrate first surface and anisotropically etching a plurality of equally spaced, parallel elongated grooves in the first surface of the substrate, each groove being bounded by {111} plane side walls and thus having a V-shaped cross-sectional area along their length;

(f) providing a communicating path between the grooves for each set of resistive material;

(g) dicing the substrate at a location near both ends of each set of grooves and in a direction perpendicular thereto, thus forming sets of open-ended grooves, each groove being between a respective resistive material and its electrodes, then dicing the substrate in a mutually perpendicular direction to produce individual printhead parts;

(h) mating at least two identical parts together with their first surfaces confronting each other, the resistive material and electrodes of one part residing in the grooves of the other part so that the parts are self-aligned and channels are formed with open ends;

(i) permenently adhering the at least two parts together to form a printhead;

(j) coating the edge of the printhead having the channel open ends which have the resistive material positioned in the channels nearer thereto for use as a common electrical return, these channels open ends being the ones to function as nozzles;

(k) closing the open ends of the channels opposite the ones functioning as nozzles;

(l) filling the channels with ink having a predetermined pressure; and (m) providing means for selectively addressing the resistive material with current pulses representative of digitized data signals for the expulsion of ink droplets in response thereto.

* * * * *